H. M. WELSHANS.
HOSE CLAMP.
APPLICATION FILED APR. 26, 1912.
1,076,851.
Patented Oct. 28, 1913.
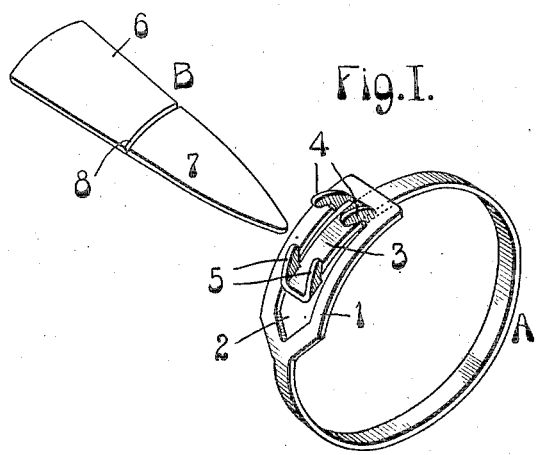
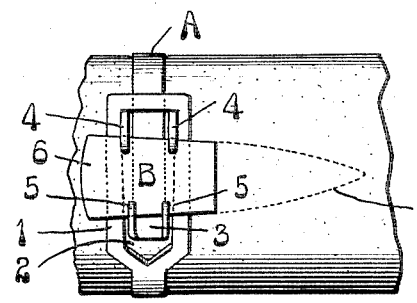
Attest
A. J. McCauley
E. B. Finn
Inventor:
H. M. Welshans
by Knight & Cook
Attys.

UNITED STATES PATENT OFFICE.

HENRY M. WELSHANS, OF SPARTA, ILLINOIS.

HOSE-CLAMP.

1,076,851.  Specification of Letters Patent.  Patented Oct. 28, 1913.

Application filed April 26, 1912. Serial No. 693,394.

*To all whom it may concern:*

Be it known that I, HENRY M. WELSHANS, a citizen of the United States of America, residing at Sparta, in the county of Randolph and State of Illinois, have invented certain new and useful Improvements in Hose-Clamps, of which the following is a full, clear, and exact description, reference being had to the accompanying drawings, forming a part of this specification.

My invention relates to that character of clamps used upon hose to secure couplings and repair devices thereto, and it has for its object to provide a device of this kind which is of very simple nature, which may be used without the employment of bolts and nuts, and which may be easily and quickly opened for the removal of the band from hose encircled by it.

Figure I is a perspective view of my hose clamp with the binder key illustrated in position for application to the band of the clamp. Fig. II is a top or plan view of my hose clamp applied to a fragment of a section of hose.

In the drawings—A designates the encircling band of my hose clamp and B the binder key used in conjunction with said band to draw it tightly around a section of hose. The band A is provided at one end with an enlarged eye piece 1 containing an elongated eye 2 that extends longitudinally of the band, and is adapted to receive the tail 3 at the opposite end of the band, in order that said tail may be adjusted in said eye piece for the purpose of contracting the diameter of the band in the clamping engagement with a section of hose circled by the band, as illustrated in Fig. II. Adjacent to the end of the eye piece 1 are a pair of upturned hooks 4 formed integral with the sides of the eye 2 of said eye piece and extending backwardly from the outer end of the latter. Adjacent to the end of the tail 3 are a pair of upturned hooks 5 formed integral with the end of the tail 3 at the sides thereof that extend backwardly from the end of the tail and which oppose the paired hooks 4 when the tail of the band is positioned in the eye 2.

The binder key B comprises a tapering or wedge shaped body composed of a butt member 6 and a point member 7 integral with each other, but partly separated by a weakening groove 8 extending transversely of the key, as seen in Fig. I.

To place my hose clamp in service, the band A is first placed around the section of hose the clamp is to be applied to, and the band is contracted sufficiently to dispose its tail 3 within the eye of the eye piece 1, in order that the paired hooks 4 and 5 located respectively upon the eye piece and the tail of the band will oppose each other, as seen in the drawings. The wedge shaped binder key is then introduced point first between the paired hooks 4 and 5, and driven forcibly between these members until the band has been closely contracted around the hose, and the butt member 6 of the binder key has become tightly wedged in the seats provided by said paired hooks. The binder key is preferably made of such dimensions that its butt member 6 will be located in the band when the latter is securely fastened around the hose; and inasmuch as the point of the binder key is thereafter of no further service, it may be severed from the butt member to avoid the likelihood of the point member engaging objects that might be encountered in drawing the hose over the ground, or any other surface. The weakening of the binder key by the provision of the transverse groove 8 permits easy severance of the point member from the butt member, inasmuch as the latter may be readily broken from the former, subsequently to the introduction of the binder key into the clamp band.

It will be noted that the tail portion of the band A extends under the end edge of the eye piece so as to prevent said edge from biting into the hose, and the extreme end of the tail 3 is held away from the hose by the binder key.

I claim:—

A hose clamp comprising an integral encircling band having, at one end, an enlarged eye piece provided with an elongated eye and a pair of upturned hooks cut out from and integral with the sides of the eye of said eye piece and extending backwardly from the outer end of the latter, and at the other end with a tail adapted to extend through the eye of the eye piece provided with a pair of upturned hooks integral with the end of the tail, at the sides thereof, and opposing the paired hooks of the eye piece when the tail of the band is inserted in the eye of the eye piece, and a binder key.

HENRY M. WELSHANS.

In the presence of—
M. J. DELANEY,
F. T. GREUSLET.